Feb. 18, 1936.    L. B. WINTON    2,030,951
RECEPTACLE FILLING APPARATUS
Filed Jan. 19, 1934    3 Sheets-Sheet 1

INVENTOR
L. B. Winton
BY
John O. Seifert
ATTORNEY

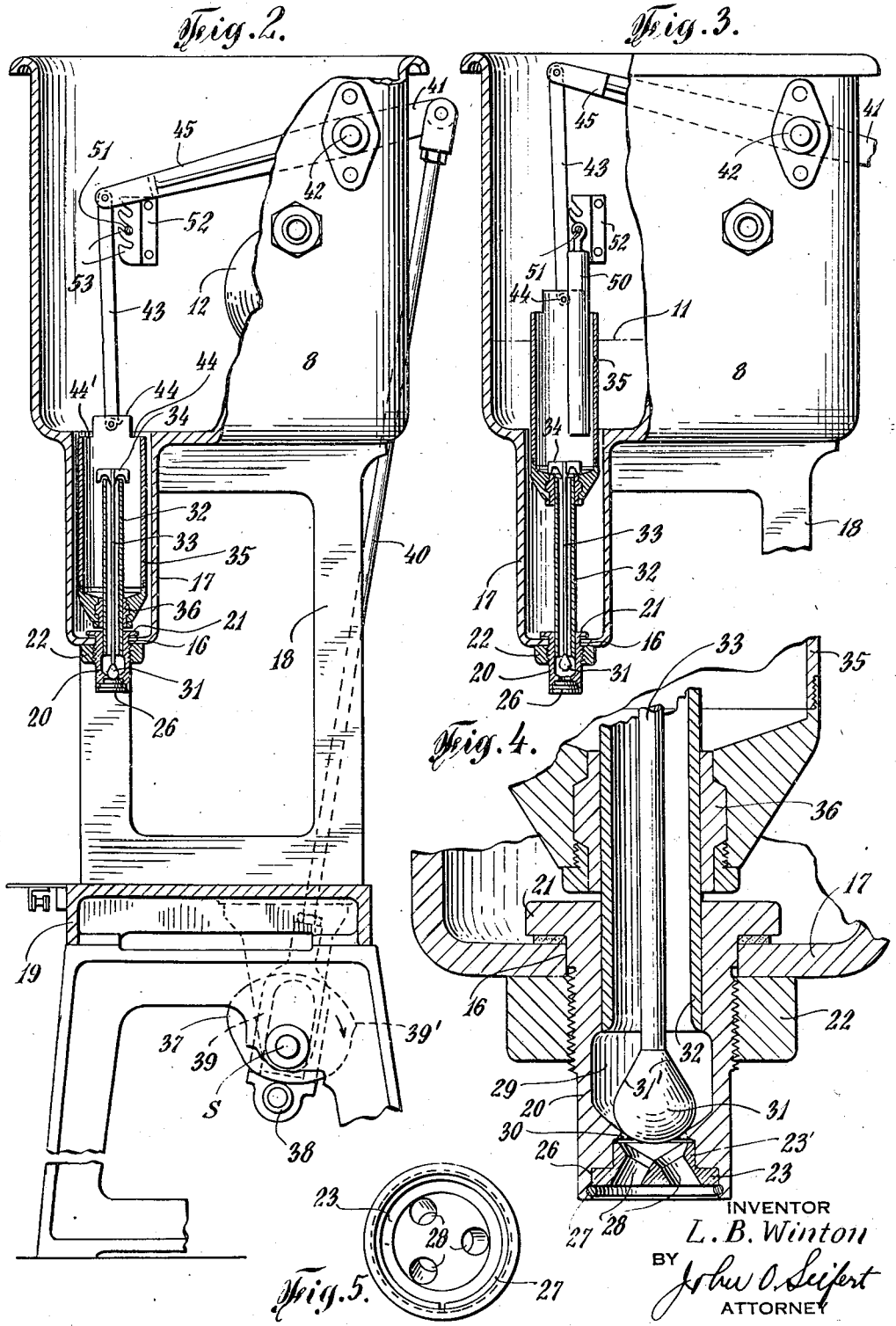

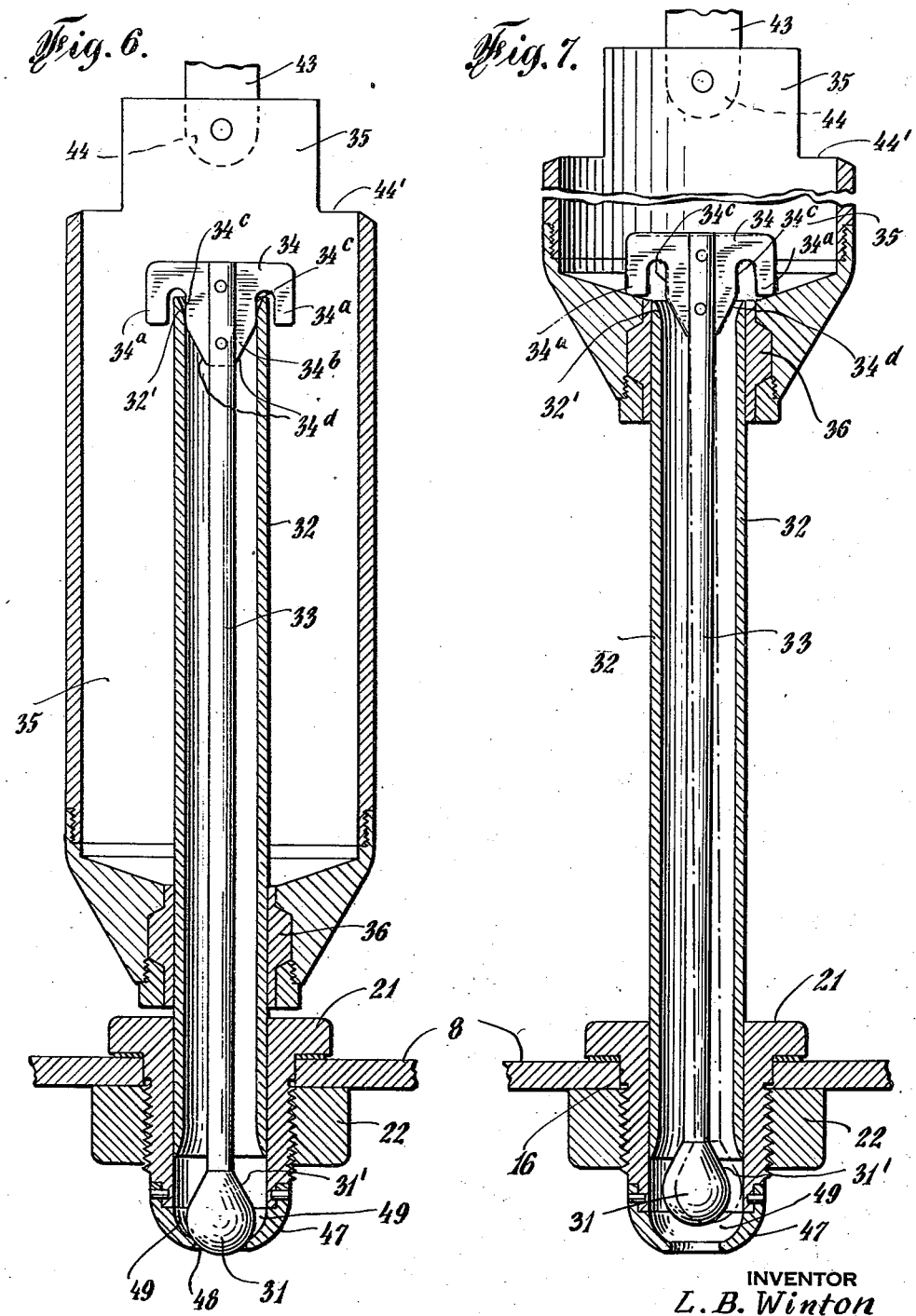

Patented Feb. 18, 1936

2,030,951

UNITED STATES PATENT OFFICE 2,030,951

RECEPTACLE FILLING APPARATUS

Lewis B. Winton, Greenwich, Conn., assignor to American Sealcone Corporation, New York, N. Y., a corporation of New York Application January 19, 1934, Serial No. 707,276

16 Claims. (Cl. 226—102)

This invention relates to apparatus for filling receptacles or containers with a predetermined measured quantity of material, such as a liquid, from a tank to a receptacle or receptacles positioned relative to outlet means from the tank, and relates particularly to the class of filling apparatus as disclosed in Letters Patent No. 1,913,570, issued June 13, 1933, wherein the liquid is discharged from the tank through a tube and a nozzle in the bottom of and opening to the exterior of the tank in which the tube is fixed at one end with the opposite end opening to the tank above the level of the liquid in the tank, the liquid being discharged from the tank in successive predetermined quantities by a measuring device in the form of a cup member or dipper of predetermined capacity slidable axially on the tube and adapted to be positioned with the inlet below the liquid level in the tank to be filled with liquid from the tank and then to position with the inlet above the liquid level and during said latter movement delivering the liquid therefrom to the tube. In said arrangement of discharge means, the discharge tube is necessarily of considerable length in order that it will at all times extend above the liquid level in the tank with the result that there is a tendency of the liquid to adhere to the wall thereof by capillary attraction and accumulation of liquid dripping therefrom onto the apparatus and receptacles as they are removed from the discharge means, requiring the wiping of the dripping from the receptacle and apparatus and rendering the same unsanitary. Furthermore, in the discharge of the liquid it is delivered from the measuring device into the tube, the liquid first forcing the air forward of the liquid from the tube, and as the inlet of the receptacle into which the liquid is to be filled must necessarily be relatively close to the discharge nozzle this air is injected into the receptacle forwardly of the liquid and the liquid as it is discharged into the receptacle mixing with such air forming bubbles, particularly when the liquid is milk for which the filling apparatus is particularly adapted.

It is the principal object of the invention to overcome the above disadvantages, namely, preventing the dripping of the liquid from the discharge means after the discharge of the measured quantity of liquid and obviate the mixing of the discharging liquid with air and creating bubbles as it is discharged into the receptacle, by providing valve mechanism for the discharge nozzle and filling the discharge tube with the liquid to constitute a part of the measured quantity and to be the initial liquid discharge, thus obviating the ejecting of air from the tube forward of the liquid and the creating of bubbles as the liquid is delivered into a receptacle, and to provide valve mechanism normally closing the discharge nozzle and adapted to be actuated to nozzle opening position by the measuring device after it is moved above the liquid level in the tank and effect a continuous flow of the liquid from the discharge tube and from the measuring device to the discharge tube.

Another object of the invention is to provide means to displace a predetermined quantity of liquid from the measuring device prior to the discharge of the contents thereof to effect the discharge of an accurately measured quantity of liquid.

A further object of the invention is to provide an improved measuring device, constructed and arranged whereby as liquid is filled therein from the tank the liquid entering the measuring device will effect a displacing of the air therefrom and obviate the mixing of the entering liquid with the air in the measuring device and consequent creating of bubbles.

Another object of the invention is to provide an improved nozzle and valve arrangement to particularly adapt the same for the filling of liquids into receptacles having considerable viscosity and slow flowing, such as oils, and the valve and nozzle arranged to co-operate in the nozzle closing position of the valve to provide a channel into which the material adhering to the discharge means and flowing to the discharge nozzle is adapted to accumulate and be held therein by capillary attraction, and thus preventing dripping of the surplus material adhering to the discharge means after the discharge of a measured quantity of material.

Other objects and advantages will hereinafter appear.

In the drawings accompanying and forming a part of this application, Figure 1 is a front elevation of a receptacle filling apparatus, partly in section, showing an embodiment of the invention, only so much of the apparatus being shown as is essential to an understanding of the invention.

Figure 2 is a side elevation, partly in section, to show the arrangement of the tank, the measuring device and valve controlled discharge means with the valve in closing position, the measuring device being in position for filling of the liquid therein and into the discharge tube from the tank.

Figure 3 is a view similar to Figure 2, showing the measuring device unseating the valve and in position to discharge the liquid therefrom, and the means for displacing liquid from the measuring device to discharge an accurately measured quantity of material.

Figure 4 is a sectional detail view, on an enlarged scale, of the discharge nozzle and the control valve therefor.

Figure 5 is a view looking at the end of the discharge nozzle.

Figure 6 is a longitudinal sectional view of the discharge means showing a modified arrangement of nozzle and valve mechanism and showing the valve in closed position; and Figure 7 is a view similar to Figure 6, but showing the valve in discharging position.

Figure 1:
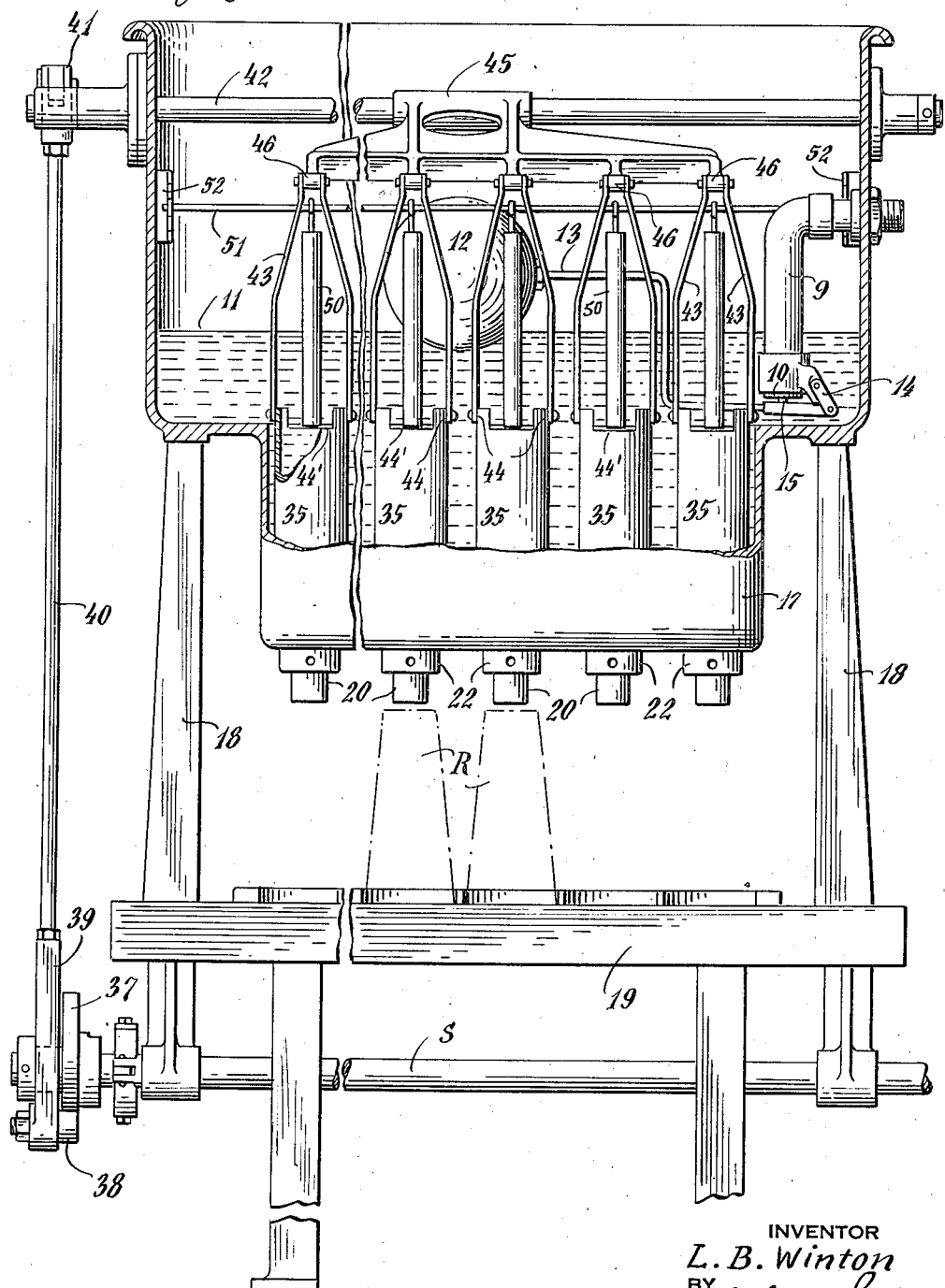

In the embodiment of the invention illustrated in Figures 1 to 5, inclusive, there is provided a liquid carrying tank 8 having an inlet pipe 9 adapted for connection with a source of supply and controlled by a valve 10, the valve being actuated and the connection of the tank with the source of supply regulated and the level of the liquid in the tank maintained substantially at a predetermined level, as shown at 11, by a float 12 carried at one end of a rod 13 having a pivotal connection at the opposite end on the pipe 9, as at 14, and a connection 15 with the valve.

While the tank may have a single outlet, it is preferably provided with a series of alined outlets 16, in the present instance five in number, whereby to simultaneously fill a number of receptacles. These outlets may be arranged in the bottom of the tank, but in order to reduce the quantity of liquid required in the tank during the receptacle filling operation they are arranged in the bottom of a portion 17 of reduced area extended from the bottom of the tank adjacent the forward wall. The tank is supported by standards 18 upon and superposed to a table 19 to serve as a support for receptacles R below and to receive liquid from the outlets of the tank. To discharge the liquid in successive predetermined quantities from the tank, a discharge means is mounted in each of the outlets, each of said means comprising a tubular member 20 having an annular flange 21 at one end, the member being extended through the opening with the flange engaging the interior of the wall about the opening with an interposed packing and clamped in position by a nut 22 threaded onto said member to abut the exterior of the wall about the opening, as shown in Figure 4. A nozzle 23 is removably mounted in the outlet end of the bore in said tubular member, the nozzle having two diameters with the portion of larger diameter engaging in a portion of increased diameter at the outer end of the bore and seated against the shoulder formed by said portion of increased diameter, as at 26, and releasably retained therein by an expansion and contractile split ring 27 engaging an annular seat within the extremity of the portion of increased diameter by the inherent expansion force thereof. The portion of least diameter of the nozzle has a recess 25 therein with a series of discharge orifices 28 diverging from the recess, although the nozzle may be provided with a single opening or orifice arranged axially thereof as shown in Figures 6 and 7. The tubular member is arranged with an intermediate portion of enlarged diameter, as at 29, to constitute a valve chamber, and said portion at the juncture thereof with the nozzle engaging portion of the tubular member is arranged with an annular inwardly extending shoulder, as at 30, to constitute a seat for a valve 31. A tube 32 is fixed at one end in the end of the bore in the tubular member 20 opposite the nozzle and is of a length to extend upward with the opposite end positioned below the level of the material in the tank, in the present instance extending upward in the reduced portion 17 below the bottom of the tank, whereby the tube may be filled with the material in the tank. The valve is carried at one end of a stem 33 extended through the tube 32 and has a valve lifter 34 fixed to the end opposite the valve and extending transversely of the end of the tube open to the tank.

The valve has an end face in the form of a globose zone, preferably in the arc of a circle, to have substantially a line contact with the valve seat and from said end face the valve converges toward its connection with the valve stem, as at 31', to permit of the ready flow of the material from the tube 32 over the valve.

To discharge the material from the tank in successive predetermined quantities, a device 35 in the form of a cup member or dipper open at the upper end and having an opening in the bottom for mounting on the tube to have axial movement thereon and the opening having a gland secured therein, as at 36, to prevent leakage between the cup member and tube. The capacity of the cup member in connection with the capacity of the tube is such as to discharge a predetermined quantity of material.

The measuring device 36 is actuated to position the inlet below the level of the material in the tank to fill the same and the tube 32 with the material, and to position with the inlet above the material level to discharge the material therefrom from a drive shaft S through a cam 37 fixed thereon, a roller 38 to follow said cam being rotatably carried by a yoke member 39 straddling the shaft S and connected through a rod 40 with an arm 41 fixed on the end of a shaft 42 rotatably mounted in and extending transversely of the tank above the material level therein, the measuring device 35 being connected with the shaft by links 43 pivotally connected at one end to diametrically opposite segmental portions of the measuring device extended from the top thereof, as at 44, and the opposite end pivotally connected to an arm 45 fixed to the shaft 42. In the use of a plurality of measuring devices to be simultaneously actuated to fill receptacles, the measuring devices are arranged in alinement, as hereinbefore set forth, and the end of the supporting arm is extended in the line of the arm supporting shaft, each pair of the connected links of the measuring devices being pivotally connected to ears extended therefrom, as shown at 46. In the position shown in Figures 1 and 2, the measuring device has been actuated to its lowermost position, and in the use of the reduced portion extended from the bottom of the tank to position below the bottom of the tank. From this position the measuring device is moved upward on the tube to the position shown in Figure 3 with the inlet of the measuring device above the level of the material in the tank and above the inlet to the discharge tube 32. Just prior to the measuring device reaching its uppermost position, the bottom of the cup member engages the valve lifter and moves the valve from valve seat 30 thereby opening the tube 32 and cup member 35 to the nozzle and the discharge of the material therethrough. The valve lifter is of flat T-form with the ends 34a of the head extending parallel of the leg portion 34b. The inner surface of the bottom of the cup member 35 is arranged to engage the ends of the parts 34a of the valve lifter to suspend the valve centrally of the discharge tube 32 and permit of the passage of the material all around the valve and prevent the material in its passage through the tube from exerting a lateral force upon the valve and positioning it at the side of the tube, as shown in dotted lines in Figure 7, and a consequent directing of the stream laterally from the nozzle, particularly when the nozzle is arranged with a single discharge orifice centrally thereof, with the result that the material will be deflected laterally of the mouth of the receptacle positioned below the nozzle. To assure the proper seating of the valve when the valve lifter is free from the bottom of the cup member, as said member is moved downward on the tube to filling position, the leg 34b of the lifter has a portion 34c of a width slightly less than the internal diameter of the tube to have a sliding fit therewith, and to direct the lifter centrally of the tube and position the valve centrally of the valve seat, the end portions of the opposite edges of the leg of the lifter are beveled to converge toward the valve rod, as shown at 34d, to co-operate with the inwardly chamfered or beveled inner surface 32' of the tube. By this arrangement, as the cup member is moved downward on the discharge tube and the valve lifter moves therewith, the converging edges of the leg 34b of the lifter will engage the inwardly inclined surface of the tube, causing the leg to assume a position centrally of the tube with the edge portions 34c engaging the inner surface of the tube, as clearly shown in Figure 6. This arrangement of the valve lifter also assures the engagement thereof by the bottom of the cup member 35 as it approaches and moves relative to the upper end of the tube 32 and the suspending of the valve from the bottom of the cup member centrally of the tube so that the material above the valve will flow in equal volume over the valve and the material will not move the valve to one side of the tube and cause the stream as it is discharged from the nozzle to be directed laterally therefrom. To assure a quick opening movement of the valve the cam is provided with the high part 39' up which the cam following roller quickly rides.

The arrangement of nozzle as shown in Figure 4 is particularly adapted for use in the filling of material or liquids having low viscosity and flowing readily. To adapt the discharge means for the filling of material or liquids into receptacles having considerable viscosity and slow flowing, such as olive oil, peanut oil, or lubricating oils, there is provided a nozzle as shown in Figures 6 and 7, comprising a cap 47 of arcuate shape in cross section having a central discharge orifice, the wall of which orifice extends substantially parallel with the axis of the tube and has a diameter less than the greatest diameter of the valve whereby the valve in closing position will extend through the orifice so that the end will be substantially in the plane of the curvature of the outer surface of the cap. By this arrangement, an annular groove or channel is formed between the outer exposed surface of the valve and the wall of the orifice substantially of triangular shape in cross section, as shown at 48 in Figures 6 and 7, adapted for the accumulation and holding therein by capillary attraction of the material which may have adhered to the valve and nozzle and thus prevent dripping of such material from the discharge means. The inner surface of the nozzle cap is spaced from the valve, as at 49, and the force of the pressure of the material in the tube will thus tend to hold the valve to its seat in the closing position of the valve, and when the valve is unseated the curvature of the surface of the cap nozzle will direct the discharging material inward and the discharge of the material in a single column or stream. Should the valve be positioned to the side of the tube, as shown in dotted lines in Figure 7, the valve will direct the material to the opposite side of the tube, and as this tends to restrict the flow of the material in the rear of the valve, it will set up a force which will tend to deflect the stream passing the valve in an opposite direction and the delivery of the stream from the nozzle orifice laterally of the mouth of the receptacle positioned relative to the discharging material.

Due to the filling of the material into the top of the cup member 35, in the measuring and discharging of the material and one material, such as oil, having a greater density than another material, such as milk, and the overflowing of the surplus material from the cup member, there may be a quantity of material slightly greater than that required retained by the cup member, which may be due to the surface tension of the material or otherwise. The measured quantity to be delivered into a receptacle comprises the quantity of material in the cup member 35 plus the material in the tube with the cup member in its lowermost position on the tube, as shown in Figures 1 and 2. It will be obvious that as the cup member is moved upward on the tube into the material in the tank that the capacity of the cup member is increased proportional to the movement of the tube out of the cup member and the varying level of the material in the tank. In order to compensate for this variation in the capacity of the cup member and assure the discharge of successive accurately measured quantities of material, means is provided to displace material from the cup member corresponding in quantity to the material displacing area of the tube as the cup member is moved upward on the tube. This means is shown as comprising a member 50 suspended in the tank in the line of movement of the cup member and of a length so that the lower end will terminate in line with the top of the cup member when in its lowermost position on the tube 32 and is engaged in the cup member as the latter commences to move upward on the tube. As shown, this member is suspended from a rod 51 supported at the opposite ends from the end walls of the tank, and to permit of adjustment of the displacer member 50 relative to the cup member, the displacer carrying bar is adjustably supported from brackets 52 fixed to the tank having a series of superposed notches 53 for the removable engagement and supporting of said rod.

To effect a discharge of air from the cup member as the material from the tank is filled therein, diametrically opposite portions of the wall are extended from the top of the cup member to which the links 43 are connected, as hereinbefore set forth. By this arrangement, as the opening to the cup member is positioned below the level of the material in the tank, the material will flow over diametrically opposite edge portions between the extensions 44 into the cup member, as shown at 44' in Figure 1, and such material entering the cup member will cause the air therein to be ejected from diametrically opposite portions in line with the extended portions 44 and prevent a mixing of the entering material with air in the cup member with a consequent creation of bubbles.

Variations may be made in the construction and arrangement of parts, and portions of the invention may be used without departing from the scope of the invention.

Having thus described my invention, I claim:

1. In receptacle filling apparatus, a liquid carrying tank, an outlet tube positioned with its inlet below the liquid level in the tank, a valve normally closing the tube outlet, and a cup member slidable on the tube adapted to be positioned below the level of the liquid in the tank to permit filling of said cup member and the tube with liquid from the tank and to position above the liquid level in the tank and deliver the liquid therefrom into the tube and actuate the valve to tube outlet opening position to deliver the liquid from the tube.

2. In receptacle filling apparatus, a liquid carrying tank having an oulet, a valve normally closing said outlet by gravity, a measuring device in communication with the outlet, and means to position the inlet to the measuring device below the liquid level in the tank to fill the liquid therein and to position with the inlet above the liquid level and the measuring device at a predetermined point in its movement with the inlet above the liquid level actuating the valve to outlet opening position to discharge the contents of the measuring device through the outlet.

3. In receptacle filling apparatus as claimed in claim 2, means adapted to displace liquid from the measuring device to effect the discharge of an accurately measured quantity of liquid.

4. In receptacle filling apparatus as claimed in claim 2, means positioned in the path of movement of the measuring device adapted to be engaged therein and displace a predetermined quantity of liquid from the measuring device prior to the actuation of the outlet valve to effect the discharge of an accurately measured quantity of liquid.

5. In receptacle filling apparatus as claimed in claim 2, a member adapted to be engaged in the measuring device prior to the actuation of the outlet valve to displace a predetermined quantity of liquid from the measuring device to effect an accurate measuring of the liquid, and means to suspend and vary the position of said member to effect variations in the quantity of liquid in the measuring device.

6. In receptacle filling apparatus, a liquid carrying tank, a discharge tube mounted at the outlet end in an opening in the bottom of the tank and extending up into the tank with the inlet end below the level of the liquid in the tank, a valve to normally close the outlet by gravity, a stem carrying said valve and suspended from a head at the inlet end of the tube, and a cup shaped member slidable on the tube to position the inlet below the liquid level in the tank to effect a filling of said member and the tube and with the inlet above the liquid level and adapted at a predetermined point in said latter movement to actuate the valve to outlet opening position and effect a discharge of the liquid from the tube and from the cup member into the tube.

7. In receptacle filling apparatus, a liquid carrying tank connected with a source of supply, a float controlled valve to regulate the connection of the tank with the source of supply and maintain the liquid substantially at a predetermined level in the tank, a discharge nozzle, a tube mounted at one end in the nozzle and extending up into the tank with the inlet end below the liquid level in the tank, a stem extended through the tube carrying a valve normally positioned by gravity to engage a seat in and close the nozzle and at the opposite end carrying a bar to bridge the tube, a cup shaped member slidable on the tube, and means operative to position said member with the inlet below the liquid level to fill said member and tube with the liquid from the tank and to position with the inlet above the liquid level and at a predetermined point in said latter movement engage and move the bar and valve carrying stem to unseat the valve to open the nozzle and effect a discharge of the liquid through the tube from the measuring member.

8. In receptacle filling apparatus, a liquid carrying tank having a portion of reduced area extended from the bottom and said reduced portion having an outlet opening in the bottom, a nozzle mounted in the opening in the bottom of said extended portion, a valve normally engaging by gravity a seat in and closing the nozzle outlet, a measuring device in communication with the nozzle adapted to be moved into the portion of reduced area to position with the inlet below the liquid level in the tank to fill the liquid therein and to position with the inlet above the liquid level and at a predetermined point in its movement with the inlet above the liquid level actuate the valve to open the nozzle outlet and discharge the liquid from the measuring device through the nozzle.

9. In receptacle filling apparatus as claimed in claim 6, wherein the cup member has opposite extended wall portions at the opening whereby to effect a flow and filling of the liquid into said cup member from substantially diametrically opposite sides as the cup member is moved below the liquid level and ejecting the air from the cup member at opposites sides of the liquid streams flowing into the cup member and in line with the extended wall portions.

10. In receptacle filling apparatus, a liquid carrying tank having a reduced portion extended from the bottom, a nozzle mounted in an opening in the bottom of said extended portion and arranged with a valve seat, a tube fixed at one end in and extended up into the reduced portion with the inlet end below the bottom of the tank, a stem carrying a valve at one end normally engaging the nozzle seat by gravity and closing the nozzle outlet and a cross bar at the opposite end bridging the inlet end of the tube, a cup shaped member mounted on the tube to have axial sliding movement thereon and of a depth less than the depth of the extended portion of the tank, and means operative to move said member into the reduced portion with the inlet below the liquid in the tank to fill the liquid from the tank therein and into the tube and to position with the inlet above the liquid level in the tank and at a predetermined point in said latter movement engage the cross bar of the valve carrying stem and unseat the valve from the nozzle and discharge the contents of the cup member through the discharge nozzle.

11. Receptacle filling apparatus as claimed in claim 10, wherein the means to move the cup member to effect a filling of the liquid therein and discharge of the liquid therefrom includes a rocker arm, a rotatable cam, and a cam follower connected to said arm, said cam being arranged whereby the cup member will be given and transmit a quick unseating movement to the valve to effect a full discharge of the liquid from the tube as the valve is unseated.

12. In receptacle filling apparatus, a liquid carrying tank, a discharge nozzle arranged with a valve seat mounted in an opening in the tank, and a valve to control the connection of the nozzle with the tank, said valve and the valve seat in the nozzle being arranged to co-operate in the nozzle closing position of the valve to form an annular channel exterior of the nozzle adapted for the accumulation and holding therein by capillary attraction of surplus liquid adhering to the valve and nozzle and prevent dripping of such material from the nozzle.

13. In receptacle filling apparatus, a liquid carrying tank having an opening in the bottom, a cap connected to said opening having a central opening arranged with an annular interior valve seat, a tube mounted at one end in the tank opening in communication with the cap opening and extending into and with the opposite end open to the tank and the wall of said end inclined inwardly, a valve to control the discharge of the liquid from the tank through the cap opening normally seated against the valve seat of the cap opening, a stem carrying said valve at one end extended through the tube having a head of T-form fixed to the end opposite the valve arranged to co-operate with the inclined end wall of the tube to center the valve relative to the tube and valve seat of the cap, and means slidable on the tube to discharge the liquid from the tank through the tube and cap opening in successive predetermined quantities adapted to co-operate with the T-head fixed to the valve stem to unseat the valve to discharge the liquid from the tube through the cap opening.

14. In receptacle filling apparatus, a liquid carrying tank having an opening in the bottom, a cap connected to said opening having a central opening arranged with an interior annular valve seat, a tube mounted at one end in the tank opening in communication with the cap opening and extending into and with the opposite end open to the tank and the wall of said end inclined inwardly, a valve to control the discharge of the liquid from the tank through the cap opening normally seated against the valve seat of the cap opening, a stem carrying said valve at one end extended through the tube having a head of T-form fixed to the end opposite the valve arranged to co-operate with the inclined end wall of the tube to center the valve relative to the tube and valve seat of the cap, and a cup member slidable axially on the tube adapted to be positioned below the level of the liquid in the tank to fill the liquid therein and to position above the liquid in the tank to deliver the liquid therefrom into the tube and adapted to engage the T-head fixed to the valve stem to unseat the valve and support the valve centrally of the tube during the discharge of the liquid from the cup member to the tube.

15. In receptacle filling apparatus embodying a tank having an opening in the bottom, discharge means mounted in said opening comprising a tubular member the bore of which is arranged with a portion of increased diameter intermediate the ends, and a nozzle engaged in said member outward from the portion of increased diameter having a recess in the inner face and orifices diverging from said recess.

16. In receptacle filling apparatus embodying a tank having an outlet in the bottom, discharge means mounted in said opening comprising a tubular member the bore of which is arranged with a valve chamber of increased diameter intermediate the ends the outer end of which is arranged with an inwardly extending annular shoulder to constitute a valve seat, and the bore of said member outward from the valve seat arranged of increased diameter, a nozzle engaging in said portion of increased diameter outward from the valve seat having a recess in the inner end and orifices diverging from said recess, and a valve within the valve chamber having a globose face of a diameter greater than the annular shoulder and less than the diameter of the valve chamber and the valve converging rearwardly from said globose face.

LEWIS B. WINTON.